(12) United States Patent
Lee et al.

(10) Patent No.: US 10,342,050 B2
(45) Date of Patent: Jul. 2, 2019

(54) METHOD FOR PERFORMING A RANDOM ACCESS PROCEDURE IN A CARRIER AGGREGATION WITH AT LEAST ONE SCELL OPERATING IN AN UNLICENSED SPECTRUM AND A DEVICE THEREFOR

(71) Applicant: LG ELECTRONICS INC., Seoul (KR)

(72) Inventors: Sunyoung Lee, Seoul (KR); Seungjune Yi, Seoul (KR); Sangwon Kim, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 15/565,117

(22) PCT Filed: Mar. 31, 2016

(86) PCT No.: PCT/KR2016/003342
§ 371 (c)(1),
(2) Date: Oct. 6, 2017

(87) PCT Pub. No.: WO2016/163687
PCT Pub. Date: Oct. 13, 2016

(65) Prior Publication Data
US 2018/0098353 A1    Apr. 5, 2018

Related U.S. Application Data

(60) Provisional application No. 62/145,468, filed on Apr. 9, 2015.

(51) Int. Cl.
*H04W 74/08* (2009.01)
*H04L 5/00* (2006.01)
(Continued)

(52) U.S. Cl.
CPC ........ *H04W 74/085* (2013.01); *H04L 5/0053* (2013.01); *H04L 5/0073* (2013.01);
(Continued)

(58) Field of Classification Search
None
See application file for complete search history.

(56) References Cited

U.S. PATENT DOCUMENTS 9,320,059 B2 * 4/2016 Lee .................. H04W 74/0833
9,591,631 B2 * 3/2017 You ........................ H04L 5/001
(Continued)

FOREIGN PATENT DOCUMENTS

WO   2012138143   10/2012
WO   2013112646    8/2013

OTHER PUBLICATIONS

PCT International Application No. PCT/KR2016/003342, Notification of Transmittal of the International Search Report and The Written Opinion of the International Searching Authority, or Declaration dated Jul. 8, 2016, 15 pages.

*Primary Examiner* — Hong S Cho
(74) *Attorney, Agent, or Firm* — Lee, Hong, Degerman, Kang & Waimey

(57) ABSTRACT

The present invention relates to a wireless communication system. More specifically, the present invention relates to a method and a device for performing a random access procedure in a carrier aggregation with at least one SCell operating in an unlicensed spectrum, the method comprising: configuring with a TAG to which at least two uplink cells belong, receiving a PDCCH order on a downlink cell associated with a first uplink cell in the TAG from an eNB; checking whether the first uplink cell belonging to the TAG is available for transmitting the random access preamble or not; selecting one uplink cell among uplink cells in the TAG which are available for transmitting the random access
(Continued)

preamble if the first cell is not available for transmitting the random access preamble; and transmitting the random access preamble indicated by the PDCCH order received from the eNB on the selected uplink cell.

14 Claims, 18 Drawing Sheets

(51) Int. Cl.
    *H04W 56/00*     (2009.01)
    *H04W 4/08*     (2009.01)
    *H04W 72/04*     (2009.01)
    *H04W 72/12*     (2009.01)

(52) U.S. Cl.
    CPC .............. *H04W 4/08* (2013.01); *H04W 56/00* (2013.01); *H04W 72/0446* (2013.01); *H04W 72/1215* (2013.01); *H04W 74/08* (2013.01); *H04L 5/001* (2013.01); *H04W 56/0005* (2013.01)

(56) References Cited

U.S. PATENT DOCUMENTS

| | | | | |
|---|---|---|---|---|
| 9,768,923 | B2* | 9/2017 | Yang | H04W 56/0005 |
| 9,814,074 | B2* | 11/2017 | Park | H04L 1/1822 |
| 2012/0195291 | A1* | 8/2012 | Kuo | H04W 4/06 |
| | | | | 370/336 |
| 2012/0257569 | A1* | 10/2012 | Jang | H04W 76/19 |
| | | | | 370/328 |
| 2013/0201910 | A1 | 8/2013 | Bergstrom et al. | |
| 2013/0258959 | A1* | 10/2013 | Dinan | H04W 56/00 |
| | | | | 370/329 |
| 2015/0071198 | A1 | 3/2015 | Deng | |
| 2015/0078286 | A1* | 3/2015 | Kim | H04L 1/18 |
| | | | | 370/329 |

* cited by examiner

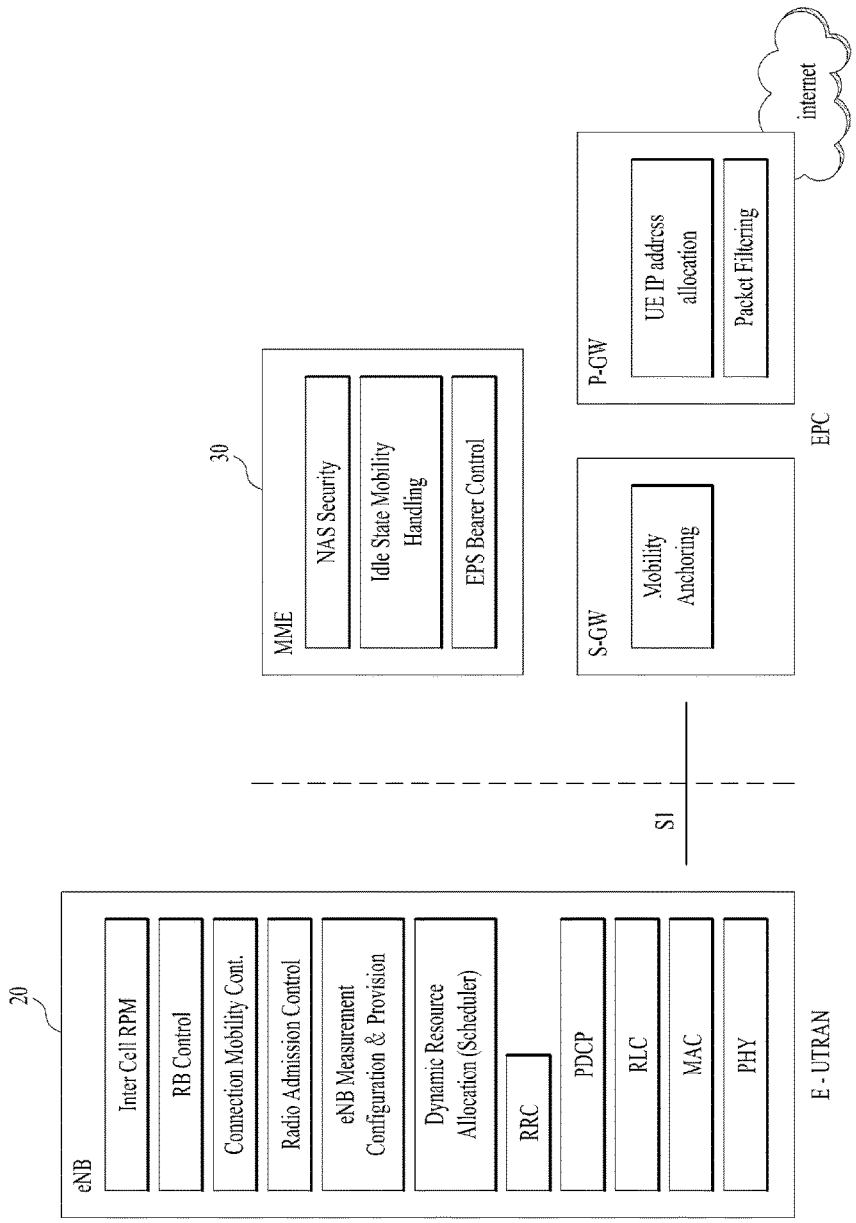

(a) Control-Plane Protocol Stack (b) User-Plane Protocol Stack

METHOD FOR PERFORMING A RANDOM ACCESS PROCEDURE IN A CARRIER AGGREGATION WITH AT LEAST ONE SCELL OPERATING IN AN UNLICENSED SPECTRUM AND A DEVICE THEREFOR

CROSS-REFERENCE TO RELATED APPLICATIONS

This application is the National Stage filing under 35 U.S.C. 371 of International Application No. PCT/KR2016/003342, filed on Mar. 31, 2016, which claims the benefit of U.S. Provisional Application No. 62/145,468, filed on Apr. 9, 2015, the contents of which are all hereby incorporated by reference herein in its entirety.

TECHNICAL FIELD

The present invention relates to a wireless communication system and, more particularly, to a method for performing a random access procedure in a carrier aggregation with at least one SCell operating in an unlicensed spectrum and a device therefor.

BACKGROUND ART

As an example of a mobile communication system to which the present invention is applicable, a 3rd Generation Partnership Project Long Term Evolution (hereinafter, referred to as LTE) communication system is described in brief.

FIG. 1 is a view schematically illustrating a network structure of an E-UMTS as an exemplary radio communication system. An Evolved Universal Mobile Telecommunications System (E-UMTS) is an advanced version of a conventional Universal Mobile Telecommunications System (UMTS) and basic standardization thereof is currently underway in the 3GPP. E-UMTS may be generally referred to as a Long Term Evolution (LTE) system. For details of the technical specifications of the UMTS and E-UMTS, reference can be made to Release 7 and Release 8 of "3rd Generation Partnership Project; Technical Specification Group Radio Access Network".

Referring to FIG. 1, the E-UMTS includes a User Equipment (UE), eNode Bs (eNBs), and an Access Gateway (AG) which is located at an end of the network (E-UTRAN) and connected to an external network. The eNBs may simultaneously transmit multiple data streams for a broadcast service, a multicast service, and/or a unicast service.

One or more cells may exist per eNB. The cell is set to operate in one of bandwidths such as 1.25, 2.5, 5, 10, 15, and 20 MHz and provides a downlink (DL) or uplink (UL) transmission service to a plurality of UEs in the bandwidth. Different cells may be set to provide different bandwidths. The eNB controls data transmission or reception to and from a plurality of UEs. The eNB transmits DL scheduling information of DL data to a corresponding UE so as to inform the UE of a time/frequency domain in which the DL data is supposed to be transmitted, coding, a data size, and hybrid automatic repeat and request (HARQ)-related information. In addition, the eNB transmits UL scheduling information of UL data to a corresponding UE so as to inform the UE of a time/frequency domain which may be used by the UE, coding, a data size, and HARQ-related information. An interface for transmitting user traffic or control traffic may be used between eNBs. A core network (CN) may include the AG and a network node or the like for user registration of UEs. The AG manages the mobility of a UE on a tracking area (TA) basis. One TA includes a plurality of cells.

Although wireless communication technology has been developed to LTE based on wideband code division multiple access (WCDMA), the demands and expectations of users and service providers are on the rise. In addition, considering other radio access technologies under development, new technological evolution is required to secure high competitiveness in the future. Decrease in cost per bit, increase in service availability, flexible use of frequency bands, a simplified structure, an open interface, appropriate power consumption of UEs, and the like are required.

DISCLOSURE

Technical Problem

An object of the present invention devised to solve the problem lies in a method and device for performing a random access procedure in a carrier aggregation with at least one SCell operating in an unlicensed spectrum.

The technical problems solved by the present invention are not limited to the above technical problems and those skilled in the art may understand other technical problems from the following description.

Technical Solution

The object of the present invention can be achieved by providing a method for User Equipment (UE) operating in a wireless communication system as set forth in the appended claims.

In another aspect of the present invention, provided herein is a communication apparatus as set forth in the appended claims.

It is to be understood that both the foregoing general description and the following detailed description of the present invention are exemplary and explanatory and are intended to provide further explanation of the invention as claimed.

Advantageous Effects

According to the present invention, if the UE receives a PDCCH order on a downlink cell that triggers a random access by indicating a random access preamble, when the UE transmits the random access preamble to the eNB, the UE transmits the random access preamble on one of the unoccupied uplink cells in a TAG, where the TAG includes an uplink cell associated with the downlink on which the UE receives the PDCCH order.

It will be appreciated by persons skilled in the art that the effects achieved by the present invention are not limited to what has been particularly described hereinabove and other advantages of the present invention will be more clearly understood from the following detailed description taken in conjunction with the accompanying drawings.

DESCRIPTION OF DRAWINGS

The accompanying drawings, which are included to provide a further understanding of the invention and are incorporated in and constitute a part of this application, illustrate embodiment(s) of the invention and together with the description serve to explain the principle of the invention.

FIG. 2B is a block diagram depicting architecture of a typical E-UTRAN and a typical EPC;

BEST MODE

Universal mobile telecommunications system (UMTS) is a 3rd Generation (3G) asynchronous mobile communication system operating in wideband code division multiple access (WCDMA) based on European systems, global system for mobile communications (GSM) and general packet radio services (GPRS). The long-term evolution (LTE) of UMTS is under discussion by the 3rd generation partnership project (3GPP) that standardized UMTS.

The 3GPP LTE is a technology for enabling high-speed packet communications. Many schemes have been proposed for the LTE objective including those that aim to reduce user and provider costs, improve service quality, and expand and improve coverage and system capacity. The 3G LTE requires reduced cost per bit, increased service availability, flexible use of a frequency band, a simple structure, an open interface, and adequate power consumption of a terminal as an upper-level requirement.

Hereinafter, structures, operations, and other features of the present invention will be readily understood from the embodiments of the present invention, examples of which are illustrated in the accompanying drawings. Embodiments described later are examples in which technical features of the present invention are applied to a 3GPP system.

Although the embodiments of the present invention are described using a long term evolution (LTE) system and a LTE-advanced (LTE-A) system in the present specification, they are purely exemplary. Therefore, the embodiments of the present invention are applicable to any other communication system corresponding to the above definition. In addition, although the embodiments of the present invention are described based on a frequency division duplex (FDD) scheme in the present specification, the embodiments of the present invention may be easily modified and applied to a half-duplex FDD (H-FDD) scheme or a time division duplex (TDD) scheme.

Figure 1:
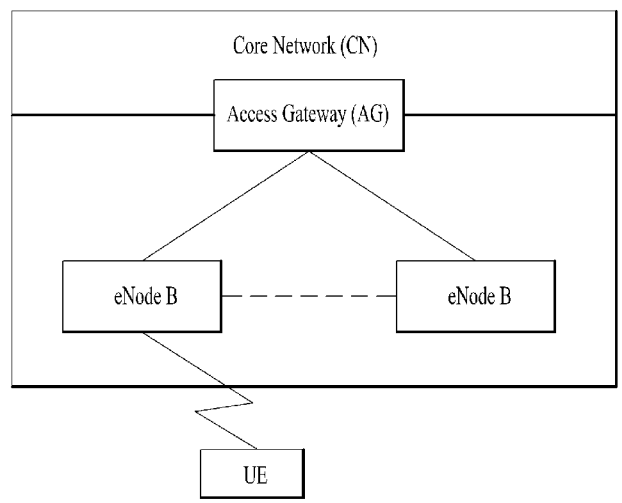
FIG. 1 is a diagram showing a network structure of an Evolved Universal Mobile Telecommunications System (E-UMTS) as an example of a wireless communication system.
Figure 2A:
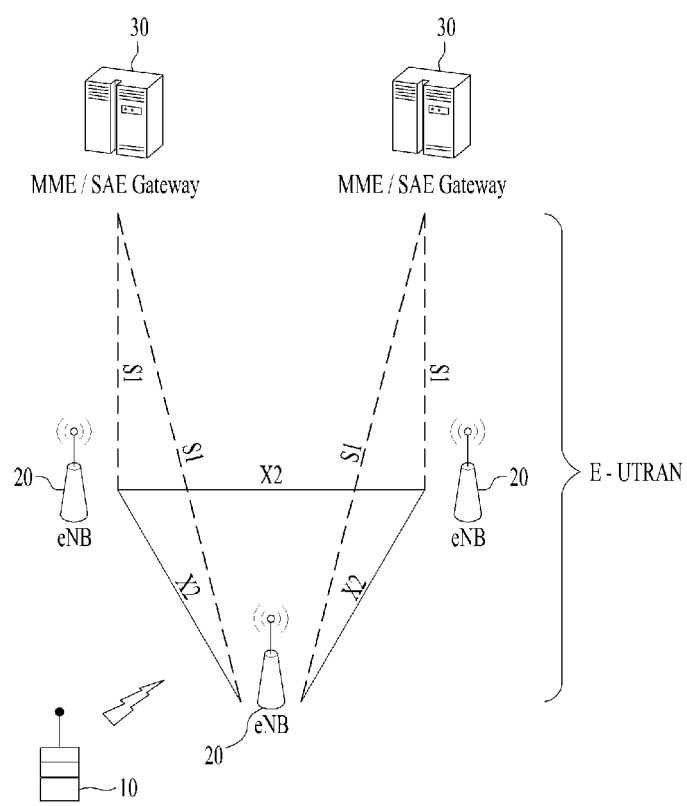
FIG. 2A is a block diagram illustrating network structure of an evolved universal mobile telecommunication system (E-UMTS)

FIG. 2A is a block diagram illustrating network structure of an evolved universal mobile telecommunication system (E-UMTS). The E-UMTS may be also referred to as an LTE system. The communication network is widely deployed to provide a variety of communication services such as voice (VoIP) through IMS and packet data.

As illustrated in FIG. 2A, the E-UMTS network includes an evolved UMTS terrestrial radio access network (E-UTRAN), an Evolved Packet Core (EPC) and one or more user equipment. The E-UTRAN may include one or more evolved NodeB (eNodeB) 20, and a plurality of user equipment (UE) 10 may be located in one cell. One or more E-UTRAN mobility management entity (MME)/system architecture evolution (SAE) gateways 30 may be positioned at the end of the network and connected to an external network.

As used herein, "downlink" refers to communication from eNodeB 20 to UE 10, and "uplink" refers to communication from the UE to an eNodeB. UE 10 refers to communication equipment carried by a user and may be also referred to as a mobile station (MS), a user terminal (UT), a subscriber station (SS) or a wireless device.

FIG. 2B is a block diagram depicting architecture of a typical E-UTRAN and a typical EPC.

As illustrated in FIG. 2B, an eNodeB 20 provides end points of a user plane and a control plane to the UE 10. MME/SAE gateway 30 provides an end point of a session and mobility management function for UE 10. The eNodeB and MME/SAE gateway may be connected via an S1 interface.

The eNodeB 20 is generally a fixed station that communicates with a UE 10, and may also be referred to as a base station (BS) or an access point. One eNodeB 20 may be deployed per cell. An interface for transmitting user traffic or control traffic may be used between eNodeBs 20.

The MME provides various functions including NAS signaling to eNodeBs 20, NAS signaling security, AS Security control, Inter CN node signaling for mobility between 3GPP access networks, Idle mode UE Reachability (including control and execution of paging retransmission), Tracking Area list management (for UE in idle and active mode), PDN GW and Serving GW selection, MME selection for handovers with MME change, SGSN selection for handovers to 2G or 3G 3GPP access networks, Roaming, Authentication, Bearer management functions including dedicated bearer establishment, Support for PWS (which includes ETWS and CMAS) message transmission. The SAE gateway host provides assorted functions including Per-user based packet filtering (by e.g. deep packet inspection), Lawful Interception, UE IP address allocation, Transport level packet marking in the downlink, UL and DL service level charging, gating and rate enforcement, DL rate enforcement based on APN-AMBR. For clarity MME/SAE gateway 30 will be referred to herein simply as a "gateway," but it is understood that this entity includes both an MME and an SAE gateway.

A plurality of nodes may be connected between eNodeB 20 and gateway 30 via the S1 interface. The eNodeBs 20 may be connected to each other via an X2 interface and neighboring eNodeBs may have a meshed network structure that has the X2 interface.

As illustrated, eNodeB 20 may perform functions of selection for gateway 30, routing toward the gateway during a Radio Resource Control (RRC) activation, scheduling and transmitting of paging messages, scheduling and transmitting of Broadcast Channel (BCCH) information, dynamic allocation of resources to UEs 10 in both uplink and downlink, configuration and provisioning of eNodeB measurements, radio bearer control, radio admission control (RAC), and connection mobility control in LTE_ACTIVE state. In the EPC, and as noted above, gateway 30 may perform functions of paging origination, LTE-IDLE state management, ciphering of the user plane, System Architecture Evolution (SAE) bearer control, and ciphering and integrity protection of Non-Access Stratum (NAS) signaling.

The EPC includes a mobility management entity (MME), a serving-gateway (S-GW), and a packet data network-gateway (PDN-GW). The MME has information about connections and capabilities of UEs, mainly for use in managing the mobility of the UEs. The S-GW is a gateway having the E-UTRAN as an end point, and the PDN-GW is a gateway having a packet data network (PDN) as an end point.

Figure 3:
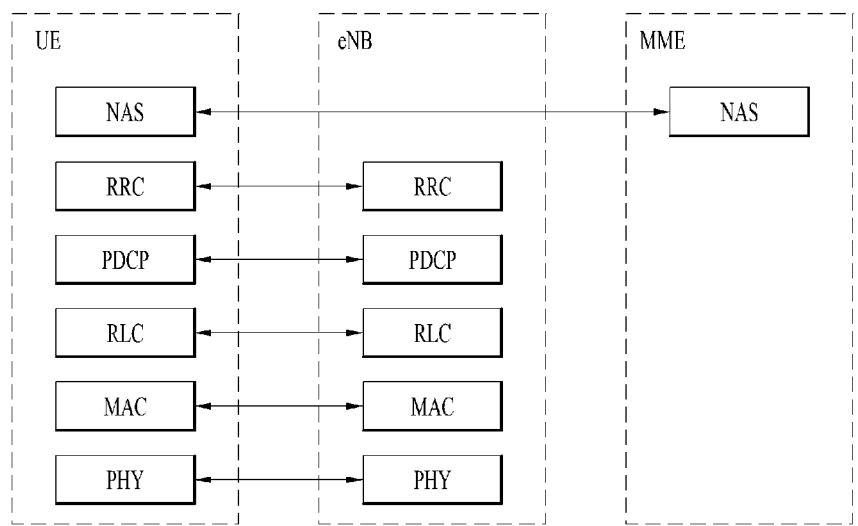
FIG. 3 is a diagram showing a control plane and a user plane of a radio interface protocol between a UE and an E-UTRAN based on a 3rd generation partnership project (3GPP) radio access network standard.
Figure 3:
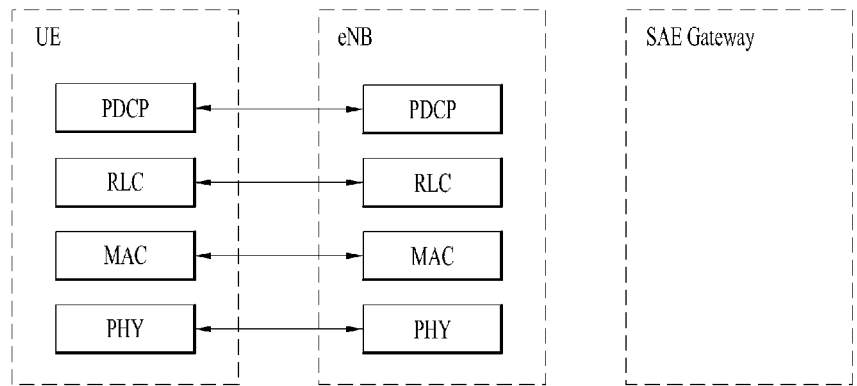

FIG. 3 is a diagram showing a control plane and a user plane of a radio interface protocol between a UE and an E-UTRAN based on a 3GPP radio access network standard. The control plane refers to a path used for transmitting control messages used for managing a call between the UE and the E-UTRAN. The user plane refers to a path used for transmitting data generated in an application layer, e.g., voice data or Internet packet data.

A physical (PHY) layer of a first layer provides an information transfer service to a higher layer using a physical channel. The PHY layer is connected to a medium access control (MAC) layer located on the higher layer via a transport channel Data is transported between the MAC layer and the PHY layer via the transport channel Data is transported between a physical layer of a transmitting side and a physical layer of a receiving side via physical channels. The physical channels use time and frequency as radio resources. In detail, the physical channel is modulated using an orthogonal frequency division multiple access (OFDMA) scheme in downlink and is modulated using a single carrier frequency division multiple access (SC-FDMA) scheme in uplink.

The MAC layer of a second layer provides a service to a radio link control (RLC) layer of a higher layer via a logical channel. The RLC layer of the second layer supports reliable data transmission. A function of the RLC layer may be implemented by a functional block of the MAC layer. A packet data convergence protocol (PDCP) layer of the second layer performs a header compression function to reduce unnecessary control information for efficient transmission of an Internet protocol (IP) packet such as an IP version 4 (IPv4) packet or an IP version 6 (IPv6) packet in a radio interface having a relatively small bandwidth.

A radio resource control (RRC) layer located at the bottom of a third layer is defined only in the control plane. The RRC layer controls logical channels, transport channels, and physical channels in relation to configuration, re-configuration, and release of radio bearers (RBs). An RB refers to a service that the second layer provides for data transmission between the UE and the E-UTRAN. To this end, the RRC layer of the UE and the RRC layer of the E-UTRAN exchange RRC messages with each other.

One cell of the eNB is set to operate in one of bandwidths such as 1.25, 2.5, 5, 10, 15, and 20 MHz and provides a downlink or uplink transmission service to a plurality of UEs in the bandwidth. Different cells may be set to provide different bandwidths.

Downlink transport channels for transmission of data from the E-UTRAN to the UE include a broadcast channel (BCH) for transmission of system information, a paging channel (PCH) for transmission of paging messages, and a downlink shared channel (SCH) for transmission of user traffic or control messages. Traffic or control messages of a downlink multicast or broadcast service may be transmitted through the downlink SCH and may also be transmitted through a separate downlink multicast channel (MCH).

Uplink transport channels for transmission of data from the UE to the E-UTRAN include a random access channel (RACH) for transmission of initial control messages and an uplink SCH for transmission of user traffic or control messages. Logical channels that are defined above the transport channels and mapped to the transport channels include a broadcast control channel (BCCH), a paging control channel (PCCH), a common control channel (CCCH), a multicast control channel (MCCH), and a multicast traffic channel (MTCH).

Figure 4:
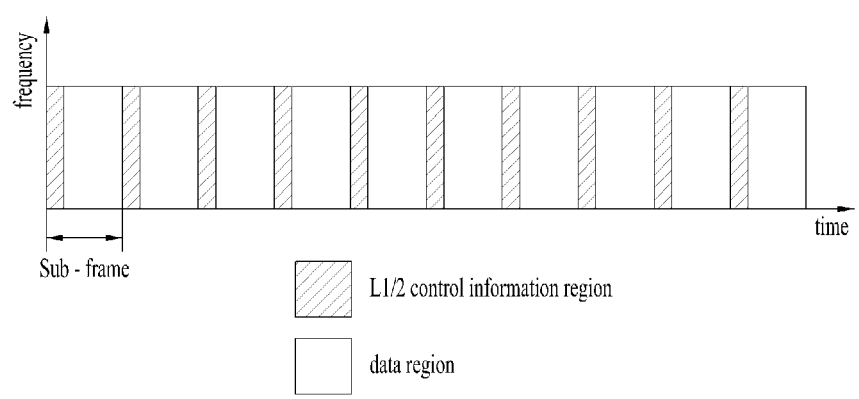
FIG. 4 is a view showing an example of a physical channel structure used in an E-UMTS system.

FIG. 4 is a view showing an example of a physical channel structure used in an E-UMTS system. A physical channel includes several subframes on a time axis and several subcarriers on a frequency axis. Here, one subframe includes a plurality of symbols on the time axis. One subframe includes a plurality of resource blocks and one resource block includes a plurality of symbols and a plurality of subcarriers. In addition, each subframe may use certain subcarriers of certain symbols (e.g., a first symbol) of a subframe for a physical downlink control channel (PDCCH), that is, an L1/L2 control channel. In FIG. 4, an L1/L2 control information transmission area (PDCCH) and a data area (PDSCH) are shown. In one embodiment, a radio frame of 10 ms is used and one radio frame includes 10 subframes. In addition, one subframe includes two consecutive slots. The length of one slot may be 0.5 ms. In addition, one subframe includes a plurality of OFDM symbols and a portion (e.g., a first symbol) of the plurality of OFDM symbols may be used for transmitting the L1/L2 control information. A transmission time interval (TTI) which is a unit time for transmitting data is 1 ms.

A base station and a UE mostly transmit/receive data via a PDSCH, which is a physical channel, using a DL-SCH which is a transmission channel, except a certain control signal or certain service data. Information indicating to which UE (one or a plurality of UEs) PDSCH data is transmitted and how the UE receive and decode PDSCH data is transmitted in a state of being included in the PDCCH.

For example, in one embodiment, a certain PDCCH is CRC-masked with a radio network temporary identity (RNTI) "A" and information about data is transmitted using a radio resource "B" (e.g., a frequency location) and transmission format information "C" (e.g., a transmission block size, modulation, coding information or the like) via a certain subframe. Then, one or more UEs located in a cell monitor the PDCCH using its RNTI information. And, a specific UE with RNTI "A" reads the PDCCH and then receive the PDSCH indicated by B and C in the PDCCH information.

Figure 5:
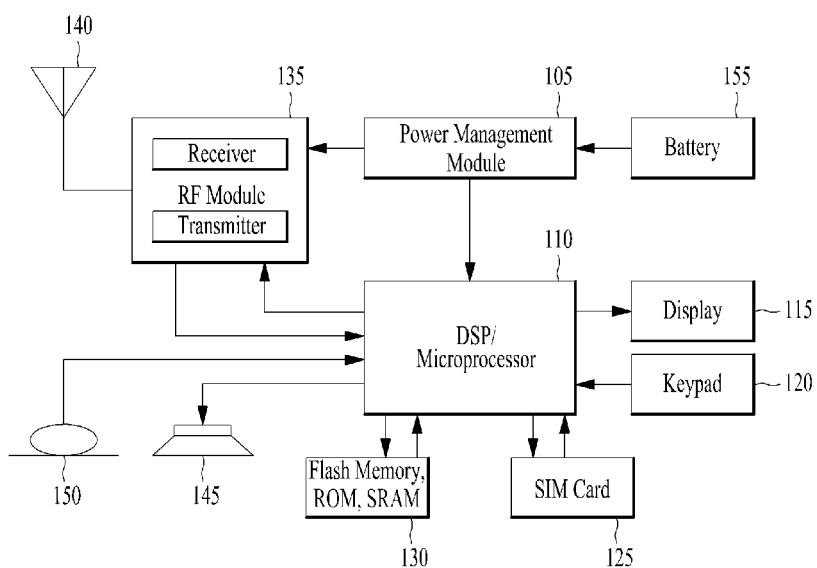
FIG. 5 is a block diagram of a communication apparatus according to an embodiment of the present invention.

FIG. 5 is a block diagram of a communication apparatus according to an embodiment of the present invention.

The apparatus shown in FIG. 5 can be a user equipment (UE) and/or eNB adapted to perform the above mechanism, but it can be any apparatus for performing the same operation.

As shown in FIG. 5, the apparatus may comprises a DSP/microprocessor (110) and RF module (transmiceiver; 135). The DSP/microprocessor (110) is electrically connected with the transciver (135) and controls it. The apparatus may further include power management module (105), battery (155), display (115), keypad (120), SIM card (125), memory device (130), speaker (145) and input device (150), based on its implementation and designer's choice.

Specifically, FIG. 5 may represent a UE comprising a receiver (135) configured to receive a request message from a network, and a transmitter (135) configured to transmit the transmission or reception timing information to the network. These receiver and the transmitter can constitute the transceiver (135). The UE further comprises a processor (110) connected to the transceiver (135: receiver and transmitter).

Also, FIG. 5 may represent a network apparatus comprising a transmitter (135) configured to transmit a request message to a UE and a receiver (135) configured to receive the transmission or reception timing information from the UE. These transmitter and receiver may constitute the transceiver (135). The network further comprises a processor (110) connected to the transmitter and the receiver. This processor (110) may be configured to calculate latency based on the transmission or reception timing information.

Figure 6:
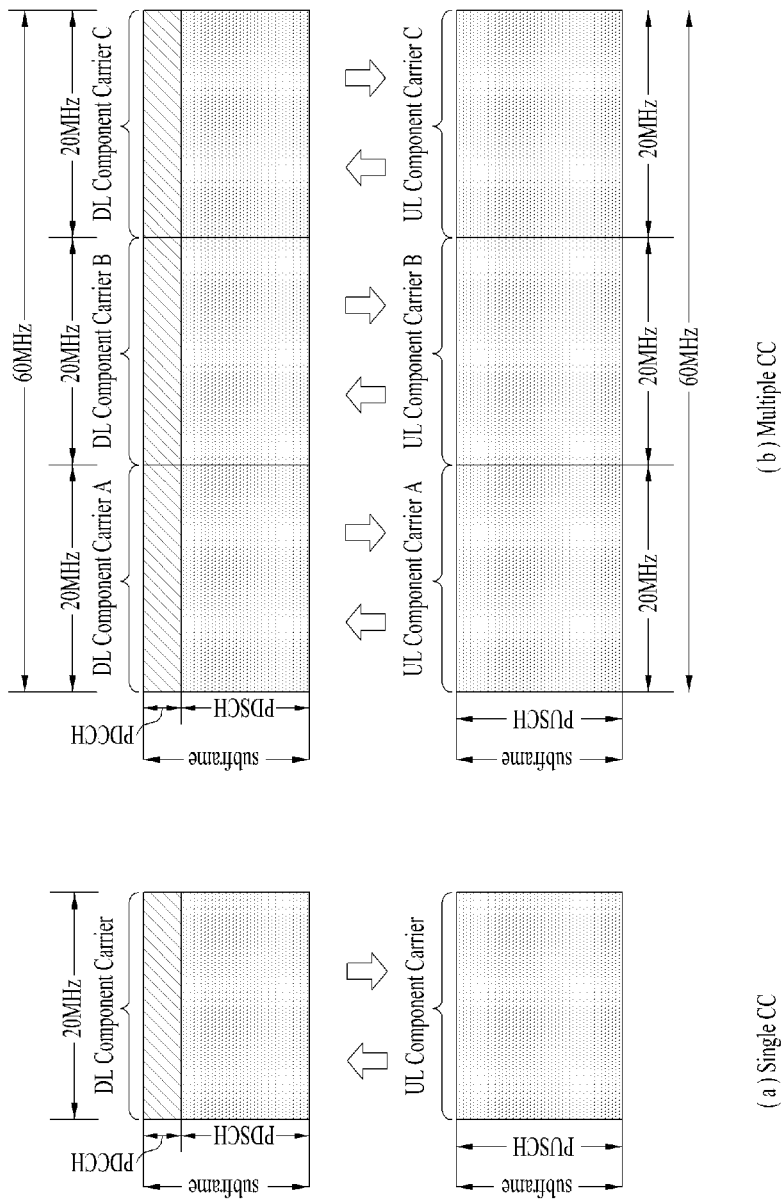
FIG. 6 illustrates an example of CCs and CA in the LTE-A system, which are used in embodiments of the present disclosure.

FIG. 6 illustrates an example of CCs and CA in the LTE-A system, which are used in embodiments of the present disclosure.

A 3GPP LTE system (conforming to Rel-8 or Rel-9) (hereinafter, referred to as an LTE system) uses Multi-Carrier Modulation (MCM) in which a single Component Carrier (CC) is divided into a plurality of bands. In contrast, a 3GPP LTE-A system (hereinafter, referred to an LTE-A system) may use CA by aggregating one or more CCs to support a broader system bandwidth than the LTE system. The term CA is interchangeably used with carrier combining, multi-CC environment, or multi-carrier environment.

In the present disclosure, multi-carrier means CA (or carrier combining). Herein, CA covers aggregation of contiguous carriers and aggregation of non-contiguous carriers. The number of aggregated CCs may be different for a DL and a UL. If the number of DL CCs is equal to the number of UL CCs, this is called symmetric aggregation. If the number of DL CCs is different from the number of UL CCs, this is called asymmetric aggregation. The term CA is interchangeable with carrier combining, bandwidth aggregation, spectrum aggregation, etc.

The LTE-A system aims to support a bandwidth of up to 100 MHz by aggregating two or more CCs, that is, by CA. To guarantee backward compatibility with a legacy IMT system, each of one or more carriers, which has a smaller bandwidth than a target bandwidth, may be limited to a bandwidth used in the legacy system.

For example, the legacy 3GPP LTE system supports bandwidths {1.4, 3, 5, 10, 15, and 20 MHz} and the 3GPP LTE-A system may support a broader bandwidth than 20 MHz using these LTE bandwidths. A CA system of the present disclosure may support CA by defining a new bandwidth irrespective of the bandwidths used in the legacy system.

There are two types of CA, intra-band CA and inter-band CA. Intra-band CA means that a plurality of DL CCs and/or UL CCs are successive or adjacent in frequency. In other words, the carrier frequencies of the DL CCs and/or UL CCs are positioned in the same band. On the other hand, an environment where CCs are far away from each other in frequency may be called inter-band CA. In other words, the carrier frequencies of a plurality of DL CCs and/or UL CCs are positioned in different bands. In this case, a UE may use a plurality of Radio Frequency (RF) ends to conduct communication in a CA environment.

The LTE-A system adopts the concept of cell to manage radio resources. The above-described CA environment may be referred to as a multi-cell environment. A cell is defined as a pair of DL and UL CCs, although the UL resources are not mandatory. Accordingly, a cell may be configured with DL resources alone or DL and UL resources.

For example, if one serving cell is configured for a specific UE, the UE may have one DL CC and one UL CC. If two or more serving cells are configured for the UE, the UE may have as many DL CCs as the number of the serving cells and as many UL CCs as or fewer UL CCs than the number of the serving cells, or vice versa. That is, if a plurality of serving cells are configured for the UE, a CA environment using more UL CCs than DL CCs may also be supported.

CA may be regarded as aggregation of two or more cells having different carrier frequencies (center frequencies). Herein, the term 'cell' should be distinguished from 'cell' as a geographical area covered by an eNB. Hereinafter, intra-band CA is referred to as intra-band multi-cell and inter-band CA is referred to as inter-band multi-cell.

In the LTE-A system, a Primacy Cell (PCell) and a Secondary Cell (SCell) are defined. A PCell and an SCell may be used as serving cells. For a UE in RRC_CONNECTED state, if CA is not configured for the UE or the UE does not support CA, a single serving cell including only a PCell exists for the UE. On the contrary, if the UE is in RRC_CONNECTED state and CA is configured for the UE, one or more serving cells may exist for the UE, including a PCell and one or more SCells.

Serving cells (PCell and SCell) may be configured by an RRC parameter. A physical-layer ID of a cell, PhysCellId is an integer value ranging from 0 to 503. A short ID of an SCell, SCellIndex is an integer value ranging from 1 to 7. A short ID of a serving cell (PCell or SCell), ServeCellIndex is an integer value ranging from 1 to 7. If ServeCellIndex is 0, this indicates a PCell and the values of ServeCellIndex for SCells are pre-assigned. That is, the smallest cell ID (or cell index) of ServeCellIndex indicates a PCell.

A PCell refers to a cell operating in a primary frequency (or a primary CC). A UE may use a PCell for initial connection establishment or connection reestablishment. The PCell may be a cell indicated during handover. In addition, the PCell is a cell responsible for control-related communication among serving cells configured in a CA environment. That is, PUCCH allocation and transmission for the UE may take place only in the PCell. In addition, the UE may use only the PCell in acquiring system information or changing a monitoring procedure. An Evolved Universal Terrestrial Radio Access Network (E-UTRAN) may change only a PCell for a handover procedure by a higher-layer RRCConnectionReconfiguration message including mobilityControlInfo to a UE supporting CA.

An SCell may refer to a cell operating in a secondary frequency (or a secondary CC). Although only one PCell is allocated to a specific UE, one or more SCells may be allocated to the UE. An SCell may be configured after RRC connection establishment and may be used to provide additional radio resources. There is no PUCCH in cells other than a PCell, that is, in SCells among serving cells configured in the CA environment.

When the E-UTRAN adds an SCell to a UE supporting CA, the E-UTRAN may transmit all system information related to operations of related cells in RRC_CONNECTED state to the UE by dedicated signaling. Changing system information may be controlled by releasing and adding a related SCell. Herein, a higher-layer RRCConnectionReconfiguration message may be used. The E-UTRAN may transmit a dedicated signal having a different parameter for each cell rather than it broadcasts in a related SCell.

After an initial security activation procedure starts, the E-UTRAN may configure a network including one or more SCells by adding the SCells to a PCell initially configured during a connection establishment procedure. In the CA environment, each of a PCell and an SCell may operate as a CC. Hereinbelow, a Primary CC (PCC) and a PCell may be used in the same meaning and a Secondary CC (SCC) and an SCell may be used in the same meaning in embodiments of the present disclosure.

FIG. 6(a) illustrates a single carrier structure in the LTE system. There are a DL CC and a UL CC and one CC may have a frequency range of 20 MHz.

FIG. 6(b) illustrates a CA structure in the LTE-A system. In the illustrated case of FIG. 6(b), three CCs each having 20 MHz are aggregated. While three DL CCs and three UL CCs are configured, the numbers of DL CCs and UL CCs are not limited. In CA, a UE may monitor three CCs simultaneously, receive a DL signal/DL data in the three CCs, and transmit a UL signal/UL data in the three CCs.

If a specific cell manages N DL CCs, the network may allocate M (M≤N) DL CCs to a UE. The UE may monitor only the M DL CCs and receive a DL signal in the M DL CCs. The network may prioritize L (L≤M≤N) DL CCs and allocate a main DL CC to the UE. In this case, the UE should monitor the L DL CCs. The same thing may apply to UL transmission.

The linkage between the carrier frequencies of DL resources (or DL CCs) and the carrier frequencies of UL resources (or UL CCs) may be indicated by a higher-layer message such as an RRC message or by system information. For example, a set of DL resources and UL resources may be configured based on linkage indicated by System Information Block Type 2 (SIB2). Specifically, DL-UL linkage may refer to a mapping relationship between a DL CC carrying a PDCCH with a UL grant and a UL CC using the UL grant, or a mapping relationship between a DL CC (or a UL CC) carrying HARQ data and a UL CC (or a DL CC) carrying an HARQ ACK/NACK signal.

Figure 7:
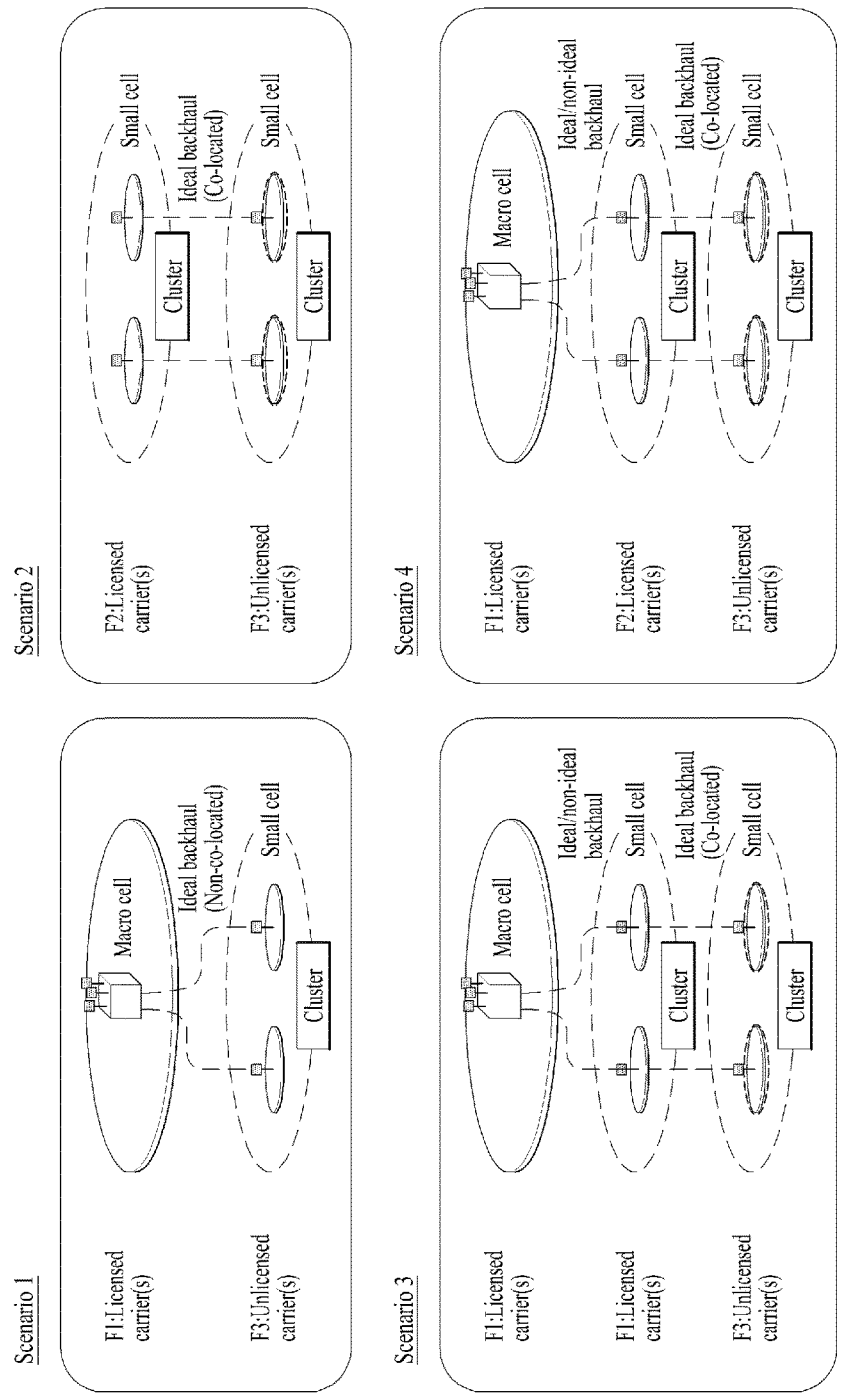
FIG. 7 is a diagram for exemplary Licensed-Assisted Access (LAA) scenarios.

FIG. 7 is a diagram for exemplary Licensed-Assisted Access (LAA) scenarios.

Carrier aggregation with at least one SCell operating in the unlicensed spectrum is referred to as Licensed-Assisted Access (LAA). In LAA, the configured set of serving cells for a UE therefore always includes at least one SCell operating in the unlicensed spectrum, also called LAA SCell. Unless otherwise specified, LAA SCells act as regular SCells and are limited to downlink transmissions in this release.

If the absence of IEEE802.11n/11ac devices sharing the carrier cannot be guaranteed on a long term basis (e.g., by level of regulation), and for this release if the maximum number of unlicensed channels that E-UTRAN can simultaneously transmit on is equal to or less than 4, the maximum frequency separation between any two carrier center frequencies on which LAA SCell transmissions are performed should be less than or equal to 62 MHz. The UE is required to support frequency separation in accordance with 36.133.

LAA eNB applies Listen-Before-Talk (LBT) before performing a transmission on LAA SCell. When LBT is applied, the transmitter listens to/senses the channel to determine whether the channel is free or busy. If the channel is determined to be free, the transmitter may perform the transmission; otherwise, it does not perform the transmission. If an LAA eNB uses channel access signals of other technologies for the purpose of LAA channel access, it shall continue to meet the LAA maximum energy detection threshold requirement. The unlicensed band can be used for a Wi-Fi band or a Bluetooth band.

It has been agreed that the LTE CA framework is reused as the baseline for LAA, and that the unlicensed carrier can only be configured as SCell. The SCell over unlicensed spectrum may be downlink only or bi-directional with DL only scenario being prioritized in the SI. LAA only applies to the operator deployed small cells. Coexistence and fair sharing with other technologies is an essential requirement for LAA in all regions.

Regarding FIG. 7, LAA targets the carrier aggregation operation in which one or more low power SCells operate in unlicensed spectrum. LAA deployment scenarios encompass scenarios with and without macro coverage, both outdoor and indoor small cell deployments, and both co-location and non-co-location (with ideal backhaul) between licensed and unlicensed carriers. FIG. 7 shows four LAA deployment scenarios, where the number of licensed carriers and the number of unlicensed carriers can be one or more. As long as the unlicensed small cell operates in the context of the carrier aggregation, the backhaul between small cells can be ideal or non-ideal. In scenarios where carrier aggregation is operated within the small cell with carriers in both the licensed and unlicensed bands, the backhaul between macro cell and small cell can be ideal or non-ideal.

Scenario 1: Carrier aggregation between licensed macro cell (F1) and unlicensed small cell (F3).

Scenario 2: Carrier aggregation between licensed small cell (F2) and unlicensed small cell (F3) without macro cell coverage.

Scenario 3: Licensed macro cell and small cell (F1), with carrier aggregation between licensed small cell (F1) and unlicensed small cell (F3).

Scenario 4: Licensed macro cell (F1), licensed small cell (F2) and unlicensed small cell (F3). In this case, there is Carrier aggregation between licensed small cell (F2) and unlicensed small cell (F3). If there is ideal backhaul between macro cell and small cell, there can be carrier aggregation between macro cell (F1), licensed small cell (F2) and unlicensed small cell (F3). If dual connectivity is enabled, there can be dual connectivity between macro cell and small cell.

In the study to support deployment in unlicensed spectrum for the above scenarios, CA functionalities are used as a baseline to aggregate PCell/PSCell on licensed carrier and SCell on unlicensed carrier. When non-ideal backhaul is applied between a Macro cell and a small cell cluster in the Scenarios 3 and 4, small cell on unlicensed carrier has to be aggregated with a small cell on licensed carrier in the small cell cluster through ideal backhaul. The focus is to identify the need of and, if necessary, evaluate needed enhancements to the LTE RAN protocols applicable to the carrier aggregation in all the above scenarios.

Figure 8:
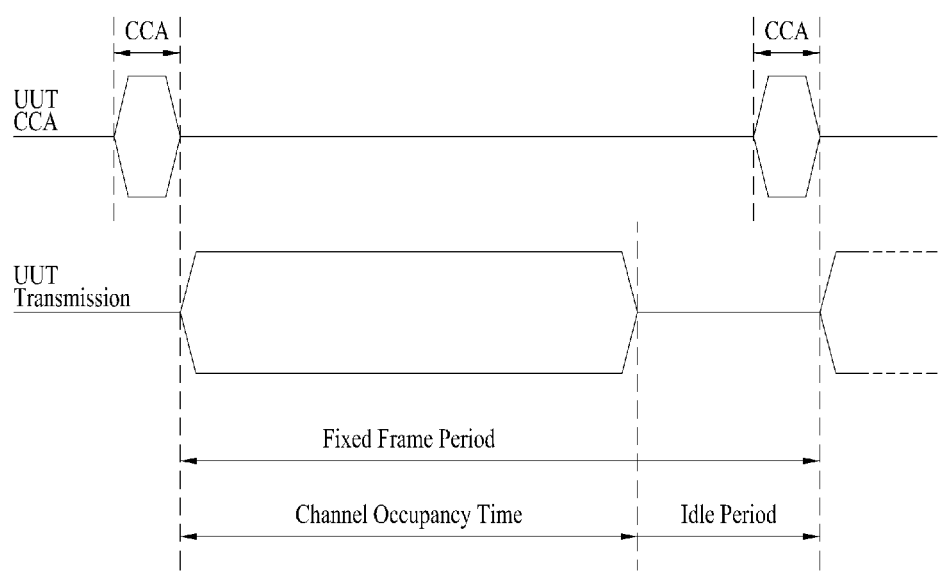
FIG. 8 is an example of LBT operation of a Frame Based Equipment (FBE)

FIG. 8 is an example of LBT operation of a Frame Based Equipment (FBE).

The Listen-Before-Talk (LBT) procedure is defined as a mechanism by which an equipment applies a clear channel assessment (CCA) check before using the channel. The CCA utilizes at least energy detection to determine the presence or absence of other signals on a channel in order to determine if a channel is occupied or clear, respectively. European and Japanese regulations mandate the usage of LBT in the unlicensed bands. Apart from regulatory requirements, carrier sensing via LBT is one way for fair sharing of the unlicensed spectrum and hence it is considered to be a vital feature for fair and friendly operation in the unlicensed spectrum in a single global solution framework.

According to ETSI regulation (EN 301 893 V1.7.1) of the Europe, two LBT operations respectively referred to as a FBE (Frame Based Equipment) and an LBE (Load Based Equipment) are shown as an example. The FBE corresponds to an equipment where the transmit/receive structure is not directly demand-driven but has fixed timing and the LBE corresponds to an equipment where the transmit/receive structure is not fixed in time but demand-driven.

The FBE configures a fixed frame using channel occupancy time (e.g., 1-10 ms) corresponding to time capable of lasting transmission when a communication node has succeeded in channel access and an idle period corresponding to minimum 5% of the channel occupancy time. CCA is defined by an operation of monitoring a channel during a CCS slot (minimum 20 μs) at an end part of the idle period.

In this case, a communication node periodically performs the CCA in a fixed frame unit. If a channel is in an unoccupied state, the communication node transmits data during the channel occupancy time. If a channel is in an occupied state, the communication node postpones data transmission and waits until a CCA slot of a next period.

Figure 9A:
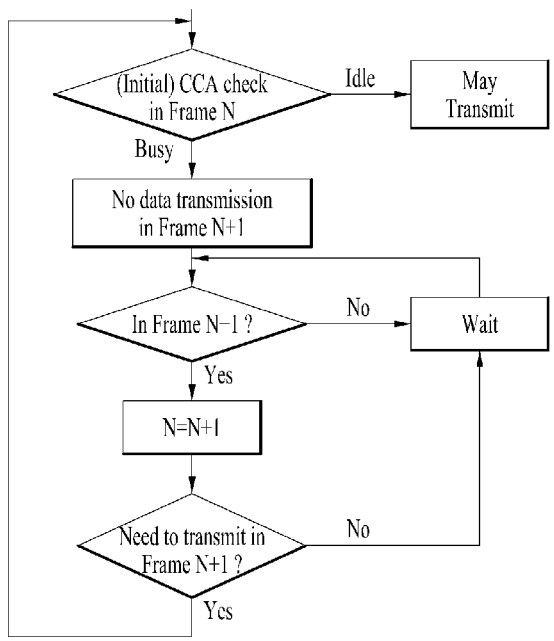
FIG. 9A is an illustration of the CCA check procedure for FBE.
Figure 9B:
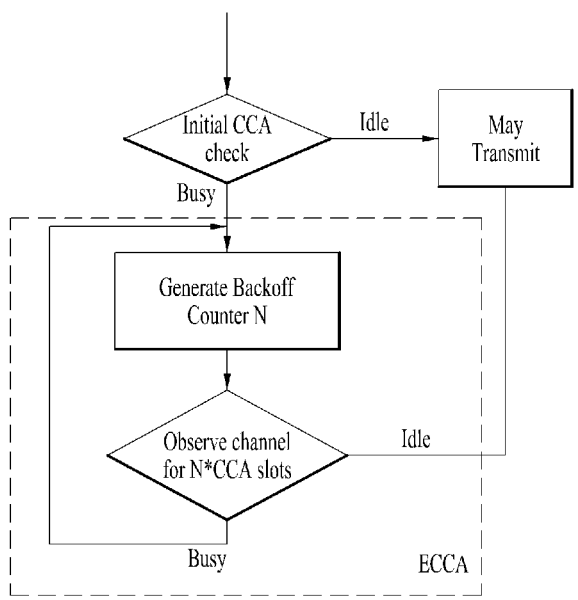
FIG. 9B is an illustration of the CCA check and backoff procedures for LBE.

A CCA (clear channel assessment) check and backoff mechanism are two key components of channel evaluation stage. FIG. 9A illustrates the CCA check procedure for FBE, in which no backoff mechanism is needed. FIG. 9A illustrates the CCA check and backoff procedure for LBE.

In order to deploy LAA eNB in regions where LBT is required, LAA eNB shall comply with LBT requirements in those regions. In addition, the LBT procedures shall be specified such that fair sharing of the unlicensed spectrum may be achieved between LAA devices themselves and among LAA and other technologies, e.g. WiFi.

After eNB acquires the unlicensed spectrum through LBT procedure successfully, it may notify its UEs the result so that preparations may be made accordingly for transmission, e.g., UE may start measurements.

CCA check (FBE and LBE) and backoff mechanism (LBE) are two major components of LBT operation, and thus are worth further clarification or study in order to fulfil LBT requirement efficiently in LAA system. Since the LBT procedure is in preparation for transmitting data or signals over unlicensed channel, it is straightforward that both MAC and PHY layers are closely involved in the LBT process. FIGS. 10A to 10D illustrate our views on the interaction and function split between MAC and PHY during the CCA check and backoff operations. They can be used to help identify the potential impacts that LBT requirements brought to RAN2.

Figure 10A:
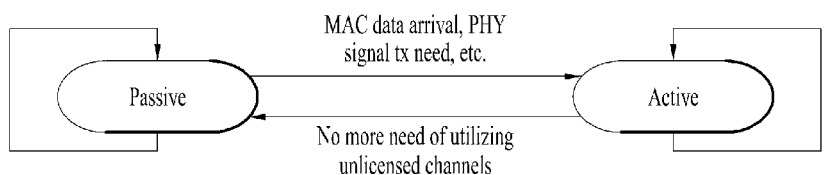
FIG. 10A is a diagram for State Transition Diagram for a LAA eNB.
Figure 10B:
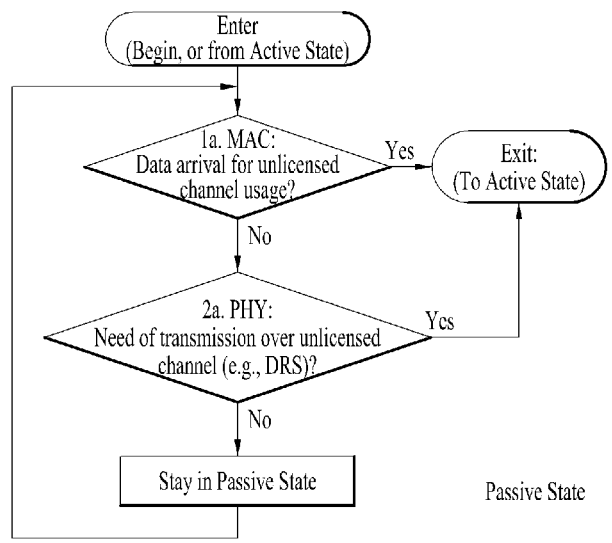
FIG. 10B is a diagram for Passive State operations for FBE and LBE.
Figure 10C:
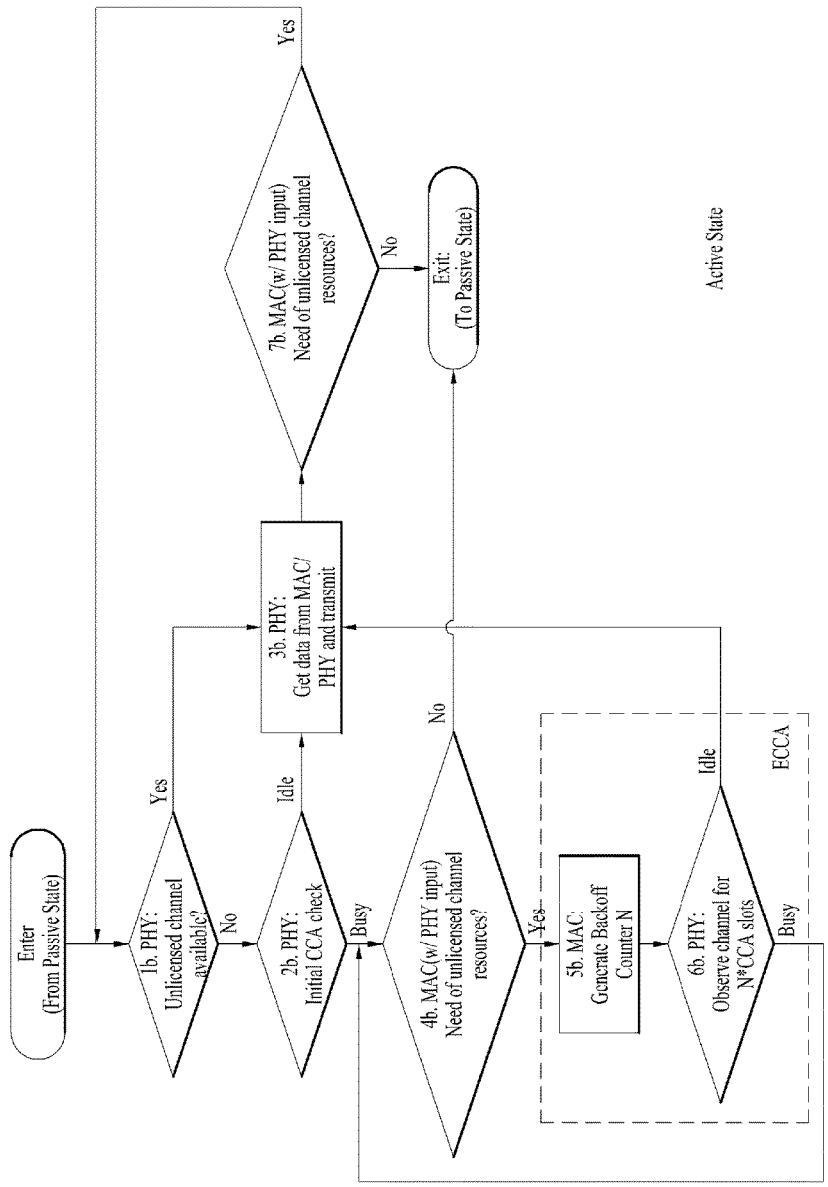
FIG. 10C is a diagram for Active State operations for LBE, and 10D is a diagram for Active State operations for FBE.

FIG. 10A is a diagram for State Transition Diagram for a LAA eNB, FIG. 10B is a diagram for Passive State operations for FBE and LBE, FIG. 10C is a diagram for Active State operations for LBE, and 10D is a diagram for Active State operations for FBE.

An LAA eNB operating status is classified as in either Active State or Passive State, as shown in FIG. 10A.

The passive state means that an LAA eNB has no need of utilizing unlicensed channels, and the active state means that an LAA eNB is in need of unlicensed resources. The transition from Passive State to Active State is triggered when radio resources over unlicensed channel is needed.

FIG. 10B depicts the operation in Passive State in more details, and is applicable to both FBE and LBE. The transition from Active State to Passive State occurs when there is no more need of unlicensed channel.

FIG. 10C outlines the operation in Active State, assuming LBE Option B requirements.

As shown in the FIG. 10C, PHY checks the availability of unlicensed channel and transmits (steps 1b, 2b, 3b and 6b), while MAC makes the scheduling decision and decides whether radio resources over unlicensed carrier is needed (steps 4b and 7b). In addition, MAC also generates backoff counter N (step 5b).

It is worth pointing out that scheduling decision in 4b and 7b considers both licensed and unlicensed channel resources. User data can be directed for transmission on either licensed or unlicensed channel. When MAC evaluates the demand for unlicensed channel resources (steps 4b and 7b), it may take PHY's need into consideration, e.g., whether DRS will be transmitted soon. Step 3b includes not only the time eNB transmits data over the unlicensed channel, but also the idle period that is required to fulfil LBT requirements, as well as the short control signalling transmission duration. The initial CCA check (step 2b) is triggered by the demand for unlicensed channel resources, such as MAC data and/or PHY signalling. This is in line with "demand-driven" definition of LBE.

For ECCA check (steps 5b and 6b), MAC provides the backoff counter N and PHY is in charge of starting and performing CCA check in each of the N ECCA slots. The reason of letting MAC but not PHY generate backoff counter value N is that the MAC scheduler has the better knowledge/prediction regarding the availability of data that may be transmitted or offloaded over unlicensed carrier(s). In addition, the knowledge of value N will help MAC scheduler predict buffering delay to some extent. At the end of a failed ECCA and before PHY starts a new round of ECCA, it is reasonable for PHY to check with MAC first whether there is still any need to access the resources of unlicensed channel. If MAC scheduler prefers to use licensed carriers for data transmissions in the next several subframes, or if MAC empties its buffer already, there is no point for PHY to start a new round of ECCA. Because of the necessity of checking with MAC (step 4b) and the benefit of MAC knowing N value, it is preferred that MAC provides the backoff counter N to PHY.

Figure 10D:
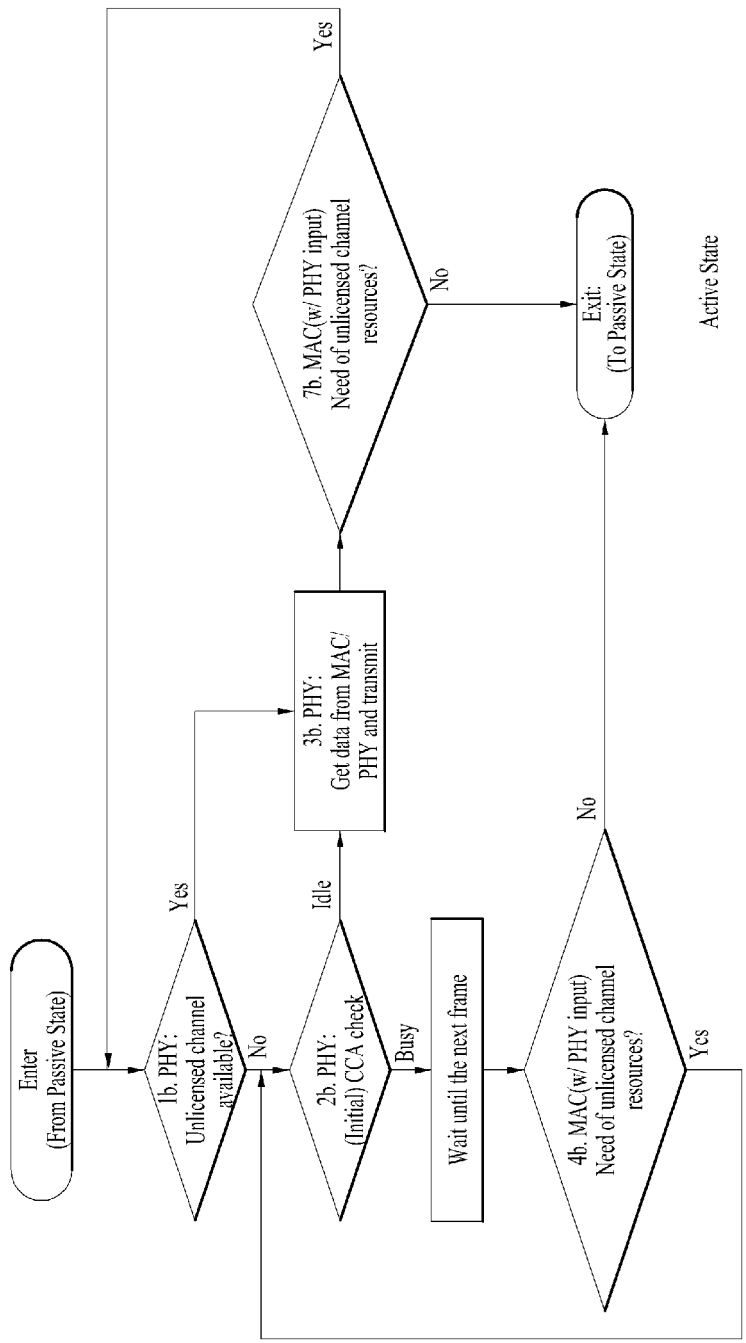

FIG. 10D outlines the operation in Active State following FBE requirements. Interpretation of each step is similar to that in FIG. 10C.

Figure 11:
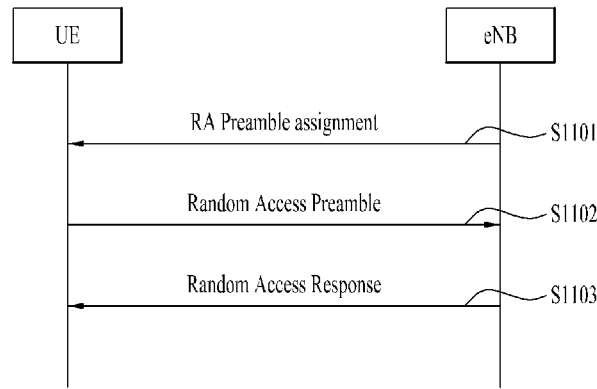
FIG. 11 is a diagram for an example method for performing a non-contention-based random access procedure.
Figure 12:
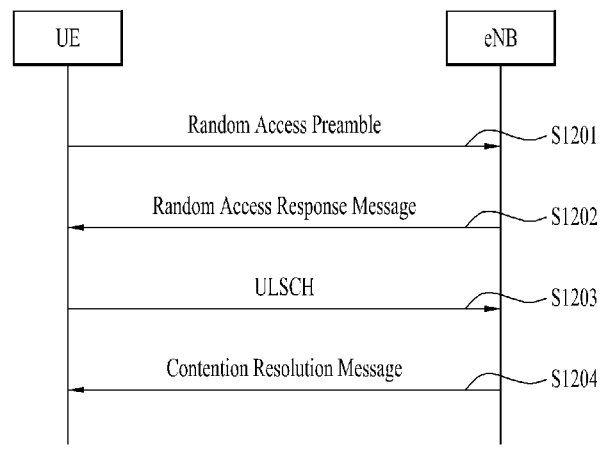
FIG. 12 is a diagram for an example method for performing a contention-based random access procedure.

FIGS. 11 and 12 are views illustrating an operating procedure of a terminal (UE) and a base station (eNB) in random access procedure. FIG. 11 is corresponding to non-contention based random access procedure and FIG. 12 is corresponding to contention based random access procedure.

The random access procedure takes two distinct forms. One is a contention based (applicable to first five events) random access procedure and the other one is a non-contention based (applicable to only handover, DL data arrival and positioning) random access procedure. The non-contention based random access procedure is also called as dedicated RACH process.

The random access procedure is performed for the following events related to the PCell: i) initial access from RRC_IDLE; ii) RRC Connection Re-establishment procedure; iii) Handover; iv) DL data arrival during RRC_CONNECTED requiring random access procedure (e.g. when UL synchronisation status is "non-synchronised"), v) UL data arrival during RRC_CONNECTED requiring random access procedure (e.g. when UL synchronisation status is "non-synchronised" or there are no PUCCH resources for SR available), and vi) For positioning purpose during RRC_CONNECTED requiring random access procedure; (e.g. when timing advance is needed for UE positioning.)

The random access procedure is also performed on a SCell to establish time alignment for the corresponding sTAG.

Regarding FIG. 11, FIG. 11 shows the non-contention based random access procedure. As described above, a non-contention based random access procedure may be performed in a handover procedure and when the random access procedure is requested by a command of an eNode B. Even in these cases, a contention based random access procedure may be performed.

First, it is important that a specific random access preamble without the possibility of collision is received from the eNode B, for the non-contention based random access procedure.

The UE receives an assigned random access preamble (S1101). Methods of receiving the random access preamble may include a method using HO command generated by target eNB and sent via source eNB for handover, a method using a Physical Downlink Control Channel (PDCCH) in case of DL data arrival or positioning, and PDCCH for initial UL time alignment for a sTAG.

The UE transmits the preamble to the eNode B after receiving the assigned random access preamble from the eNode B as described above (S1103).

The UE attempts to receive a random access response within a random access response reception window indicated by the eNode B through a handover command or system information after transmitting the random access preamble in step S1103 (S1105). More specifically, the random access response information may be transmitted in the form of a Medium Access Control (MAC) Packet Data Unit (PDU), and the MAC PDU may be transferred via a Physical Downlink Shared Channel (PDSCH). In addition, the UE preferably monitors the PDCCH in order to enable to the UE to properly receive the information transferred via the PDSCH. That is, the PDCCH may preferably include information about a UE that should receive the PDSCH, frequency and time information of radio resources of the PDSCH, a transfer format of the PDSCH, and the like. Here, if the PDCCH has been successfully received, the UE may appropriately receive the random access response transmitted on the PDSCH according to information of the PDCCH. The random access response may include a random access preamble identifier (e.g. Random Access-Radio Network Temporary Identifier (RA-RNTI)), an UL Grant indicating uplink radio resources, a temporary C-RNTI, a Time Advance Command (TAC), and the like.

As described above, the reason why the random access response includes the random access preamble identifier is because a single random access response may include random access response information of at least one UE and thus it is reported to which UE the UL Grant, the Temporary C-RNTI and the TAC are valid. In this step, it is assumed that the UE selects a random access preamble identifier matched to the random access preamble selected by the UE in step S1103.

In the non-contention based random access procedure, it is determined that the random access procedure is normally performed, by receiving the random access response information, and the random access procedure may be finished.

When performing non-contention based random access on the PCell while CA is configured, the Random Access Preamble assignment via PDCCH of steps S1101, S1103 and S1105 of the non-contention based random access procedure occur on the PCell. In order to establish timing advance for a sTAG, the eNB may initiate a non-contention based random access procedure with a PDCCH order (S1101) that is sent on a scheduling cell of activated SCell of the sTAG. Preamble transmission (S1103) is on the indicated SCell and Random Access Response (S1105) takes place on PCell.

FIG. 12 is a view illustrating an operating procedure of a UE and an eNB in a contention based random access procedure.

First, the UE may randomly select a single random access preamble from a set of random access preambles indicated through system information or a handover command, and select and transmit a Physical Random Access Channel (PRACH) capable of transmitting the random access preamble (S1201).

There are two possible groups defined and one is optional. If both groups are configured the size of message 3 and the pathloss are used to determine which group a preamble is selected from. The group to which a preamble belongs provides an indication of the size of the message 3 and the radio conditions at the UE. The preamble group information along with the necessary thresholds are broadcast on system information.

A method of receiving random access response information is similar to the above-described non-contention based random access procedure. That is, the UE attempts to receive its own random access response within a random access response reception window indicated by the eNode B through the system information or the handover command, after the random access preamble is transmitted in step S1201, and receives a Physical Downlink Shared Channel (PDSCH) using random access identifier information corresponding thereto (S1203). Accordingly, the UE may receive a UL Grant, a Temporary C-RNTI, a TAC and the like.

If the UE has received the random access response valid for the UE, the UE may process all of the information included in the random access response. That is, the UE applies the TAC, and stores the temporary C-RNTI. In addition, data which will be transmitted in correspondence with the reception of the valid random access response may be stored in a Msg3 buffer.

The UE uses the received UL Grant so as to transmit the data (that is, the message 3) to the eNode B (S1205). The message 3 should include a UE identifier. In the contention based random access procedure, the eNode B may not determine which UEs are performing the random access procedure, but later the UEs should be identified for contention resolution.

Here, two different schemes for including the UE identifier may be provided. A first scheme is to transmit the UE's cell identifier through an uplink transmission signal corresponding to the UL Grant if the UE has already received a valid cell identifier allocated by a corresponding cell prior to the random access procedure. Conversely, the second scheme is to transmit the UE's unique identifier (e.g., S-TMSI or random ID) if the UE has not received a valid cell identifier prior to the random access procedure. In general, the unique identifier is longer than the cell identifier. If the UE has transmitted data corresponding to the UL Grant, the UE starts a contention resolution (CR) timer.

After transmitting the data with its identifier through the UL Grant included in the random access response, the UE waits for an indication (instruction) from the eNode B for contention resolution. That is, the UE attempts to receive the PDCCH so as to receive a specific message (S1207). Here, there are two schemes to receive the PDCCH. As described above, the UE attempts to receive the PDCCH using its own cell identifier if the message 3 transmitted in correspondence with the UL Grant is transmitted using the UE's cell identifier, and the UE attempts to receive the PDCCH using the temporary C-RNTI included in the random access response if the identifier is its unique identifier. Thereafter, in the former scheme, if the PDCCH is received through its own cell identifier before the contention resolution timer is expired, the UE determines that the random access procedure has been normally performed and completes the random access procedure. In the latter scheme, if the PDCCH is received through the temporary C-RNTI before the contention resolution timer has expired, the UE checks data transferred by the PDSCH indicated by the PDCCH. If the unique identifier of the UE is included in the data, the UE determines that the random access procedure has been normally performed and completes the random access procedure.

The Temporary C-RNTI is promoted to C-RNTI for a UE which detects RA success and does not already have a C-RNTI; it is dropped by others. A UE which detects RA success and already has a C-RNTI, resumes using its C-RNTI.

When CA is configured, the first three steps of the contention based random access procedures occur on the PCell while contention resolution (S1207) can be cross-scheduled by the PCell.

Figure 13:
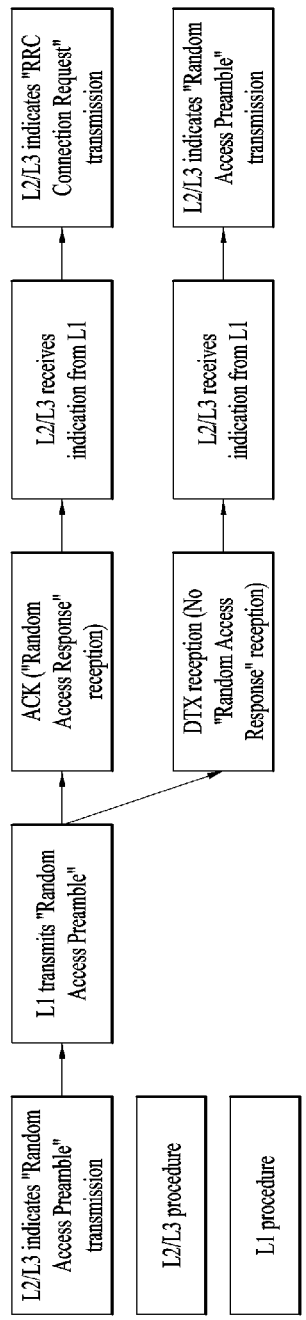
FIG. 13 is a view illustrating for interaction model between L1 and L2/3 for Random Access Procedure.

FIG. 13 is a view illustrating for interaction model between L1 and L2/3 for Random Access Procedure.

Random access procedure described above is modelled in FIG. 10 below from L1 and L2/3 interaction point of view. L2/L3 receives indication from L1 whether ACK is received or DTX is detected after indication of Random Access Preamble transmission to L1. L2/3 indicates L1 to transmit first scheduled UL transmission (RRC Connection Request in case of initial access) if necessary or Random Access Preamble based on the indication from L1.

The Random Access procedure described in this subclause is initiated by a PDCCH order, by the MAC sublayer itself or by the RRC sublayer. Random Access procedure on an SCell shall only be initiated by a PDCCH order. If a MAC entity receives a PDCCH transmission consistent with a PDCCH order masked with its C-RNTI, and for a specific Serving Cell, the MAC entity shall initiate a Random Access procedure on this Serving Cell. For Random Access on the SpCell a PDCCH order or RRC optionally indicate the ra-PreambleIndex and the ra-PRACH-MaskIndex; and for Random Access on an SCell, the PDCCH order indicates the ra-PreambleIndex with a value different from 000000 and the ra-PRACH-MaskIndex. For the pTAG preamble transmission on PRACH and reception of a PDCCH order are only supported for SpCell.

The Random Access procedure shall be performed as follows: flusing the Msg3 buffer, setting the PREAMBLE_TRANSMISSION_COUNTER to 1, and setting the backoff parameter value to 0 ms, and proceeding to the selection of the Random Access Resource.

The Random Access Resource selection procedure shall be performed as follows. The Random Access Preamble and the PRACH Mask Index are those explicitly signalled if ra-PreambleIndex (Random Access Preamble) and ra-PRACH-MaskIndex (PRACH Mask Index) have been explicitly signalled and ra-PreambleIndex is not 000000.

If ra-PreambleIndex (Random Access Preamble) and ra-PRACH-MaskIndex (PRACH Mask Index) have not been explicitly signalled, the MAC entity shall select the Random Access Preambles group A or B. And the MAC entity shall randomly select a Random Access Preamble within the selected group. The random function shall be such that each of the allowed selections can be chosen with equal probability, and set PRACH Mask Index to 0. And the MAC entity proceeds to the transmission of the Random Access Preamble.

The random-access procedure shall be performed as follows: the MAC entity sets PREAMBLE_RECEIVED_TARGET_POWER to preambleInitialReceivedTargetPower+DELTA_PREAMBLE+(PREAMBLE_TRANSMISSION_COUNTER-1)*powerRampingStep, and instructing the physical layer to transmit a preamble using the selected PRACH, corresponding RA-RNTI, preamble index and PREAMBLE_RECEIVED_TARGET_POWER.

Once the Random Access Preamble is transmitted and regardless of the possible occurrence of a measurement gap, the MAC entity shall monitor the PDCCH of the SpCell for Random Access Response(s) identified by the RA-RNTI defined below, in the RA Response window which starts at the subframe that contains the end of the preamble transmission plus three subframes and has length ra-ResponseWindowSize subframes.

In Rel-12 Carrier Aggregation only contention free random access is supported on SCells. We assume that this is sufficient also on LAA carriers. Also, in Rel-12 the Random Access Response is sent on the PCell, we assume that this can be reused also for LAA carriers.

However, one issue which comes about when doing RA on LAA carriers is that transmissions related to the RA procedure will, seemingly random, need to be dropped due to a busy channel. The Random Access Response (RAR) is always sent on the PCell in Carrier Aggregation and the PCell is always on a licensed carrier so LAA will not impact the RAR reception, but preambles may be randomly dropped since they can be transmitted on LAA-carriers.

That a UE may drop preamble transmission is nothing new though; already in Rel-12 it was introduced for Dual Connectivity that UEs may drop preamble transmissions due to power limitations. Because how the UE calculated the power ramping for preambles, dropping a preamble would cause too much power ramping, i.e. the UE may ramp the preamble transmission power even when a preamble was dropped. To avoid too much power-ramping the specification was changed so that the UE only ramps the power when the preamble was actually transmitted, not when dropping a preamble. The handling of preamble transmission dropping from Rel-12 Dual Connectivity is used as baseline for preamble dropping on LAA carriers.

Figure 14:
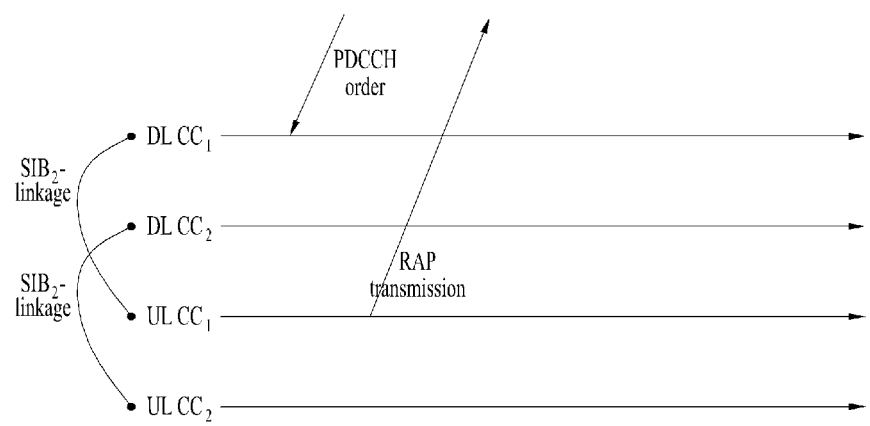
FIG. 14 is an example for performing a contention free random access according to the prior art.

FIG. 14 is an example for performing a contention free random access according to the prior art.

Up to Rel-12, the eNB sends PDCCH order to trigger a contention free random access on a concerned cell. When the UE receives the PDCCH order on a cell, the UE triggers a contention free based random access on the cell on which the UE received the PDCCH order by using the indicated random access preamble. In Rel-12, when the UE dropped transmission of random access preamble due to power limitation, the UE does not increase the preamble counter and preamble transmission power.

In Rel-13, SI on LAA has been started in 3GPP, where unlicensed cell can be used for data transmission unless it is occupied by others. For this, LBT (listen-before-talk) mechanism is used where the transmitter scans the frequency to determine whether it is occupied or not. Although the transmitter starts the data transmission after determining that the unlicensed cell is not occupied, the transmitter can only use that unlicensed cell up to the maximum occupancy time, e.g., 10 ms.

There would be a potential impact/issue on random access preamble transmission.

For example, assume that the eNB sends a PDCCH order to the UE for uplink synchronization. Accordingly, the UE will trigger contention free random access procedure on a cell which is on an unlicensed frequency. The UE may not be able to transmit the random access preamble (RAP) on the cell if the cell is occupied by others during transmission of the RAP. In the prior art, the UE would drop the RAP transmission and not increase the preamble transmission counter/power while expecting to transmit the RAP soon. However, in LAA situation, it may be difficult to expect that the UE can use the cell soon, which results in undesirable delay on data transmission on that cell.

Therefore, a new mechanism is needed to transmit RAP in LAA environment and get uplink synchronization.

Figure 15:
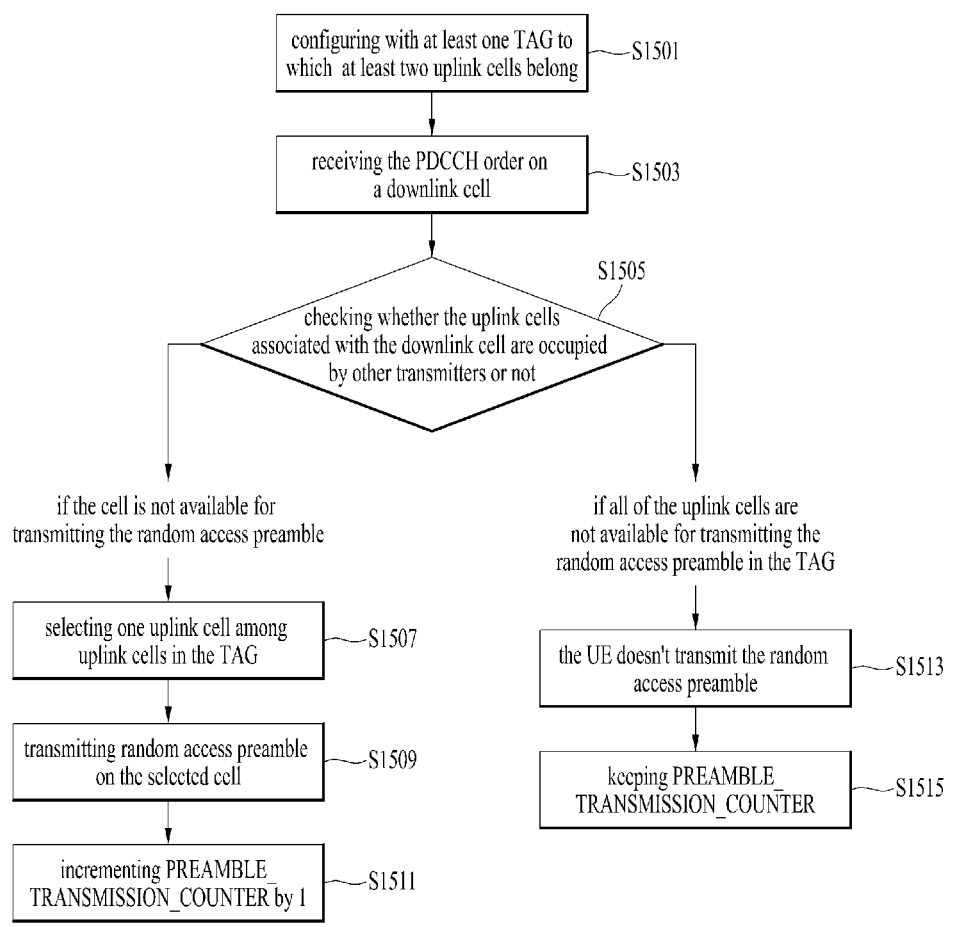
FIG. 15 is a conceptual diagram for performing a random access procedure in a carrier aggregation with at least one SCell operating in an unlicensed spectrum according to embodiments of the present invention.

FIG. 15 is a conceptual diagram for performing a random access procedure in a carrier aggregation with at least one SCell operating in an unlicensed spectrum according to embodiments of the present invention.

In this invention, if the UE receives a PDCCH order on a downlink cell that triggers a random access by indicating a random access preamble, when the UE transmits the random access preamble to the eNB, the UE transmits the random access preamble on one of the unoccupied uplink cells in a TAG, where the TAG includes an uplink cell associated with the downlink on which the UE receives the PDCCH order.

It is assumed that the eNB and the UE determine whether a cell is occupied or not by other transmitter before transmitting data on the cell.

The eNB configures the UE with at least one TAG to which at least two uplink cells belong (S1501).

The eNB sends a PDCCH order indicating the ra-PreambleIndex with a value different from 000000 to the UE on a downlink cell (S1503).

The downlink cell is associated with an uplink cell as indicated by the eNB through SIB2. The uplink cell associated with the downlink cell is called SIB2-linked uplink cell.

If the UE receives the PDCCH order on a downlink cell indicating the ra-PreambleIndex with a value different from 000000, when the UE selects the random access preamble, the UE checks a TAG to which a SIB2-linked uplink cell belongs to, where the SIB2-linked uplink cell is associated with the downlink cell on which the UE received the PDCCH order.

In the TAG to which the SIB2-linked uplink cell belongs, for all uplink cells belong the TAG, the UE checks whether the uplink cells are occupied by other transmitters or not (S1505).

Among the uplink cells which are not occupied by other transmitters, the UE selects one uplink cell if the uplink cell is not available for transmitting the random access preamble (S1507). On the selected uplink cell, the UE transmits the random access preamble indicated by the PDCCH order received from the eNB (S1509).

The UE increments PREAMBLE_TRANSMISSION_COUNTER by 1 when the random access preamble is transmitted to the eNB on the selected uplink cell (S1511).

If all of the uplink cells are not available for transmitting the random access preamble in the TAG, the UE doesn't transmit the random access preamble (S1513). When the random access preamble is not transmitted, a value of PREAMBLE_TRANSMISSION_COUNTER is not increased (S1515).

That a cell belonging to the TAG is not available for transmitting the random access preamble comprises that the cell is determined to be occupied by other transmitters as a result of LBT procedure.

In this case, that PREAMBLE_TRANSMISSION_COUNTER is increased by 1 when a random access preamble indicated by a PDCCH order is transmitted on an uplink cell different from an uplink cell associated with a downlink cell on which the PDCCH order is received means that the UE keeps the triggered random access procedure using a new cell, not initiates a new random access procedure on a new cell. That is, this invention features in that the UE can performs the triggered random access procedure using another cell successfully although the UE cannot use a cell associated with a downlink cell in which the PDCCH order by which the random access is triggered is received because the cell is determined to be occupied by other transmitters as a result of LBT procedure. Indeed, the UE had better select one of cells in the same TAG to which an uplink cell associated with a downlink cell on which the PDCCH order is received belongs to transmit the preamble, because uplink synchronization is configured per a TAG.

When the UE selects one uplink cell among the uplink cells which are not occupied by other transmitters, the UE selects a random uplink cell, or an uplink cell with a highest radio quality, or an uplink cell that is not occupied by other transmitters for the longest time, or an uplink cell that is not occupied by other transmitters for the shortest time, or an uplink cell on which the UE performs the last random access preamble transmission, or a SIB2-linked uplink cell associated with the downlink cell on which the UE received the PDCCH order.

Preferably, the UE can perform above behaviour in the following cases if the UE receives the PDCCH order on a licensed downlink cell, or if the UE receives the PDCCH order on a unlicensed downlink cell, or if the UE receives the PDCCH order on a licensed downlink cell which is associated with an unlicensed uplink cell, or if the UE receives the PDCCH order on an unlicensed downlink cell which is associated with an unlicensed uplink cell.

Figure 16:
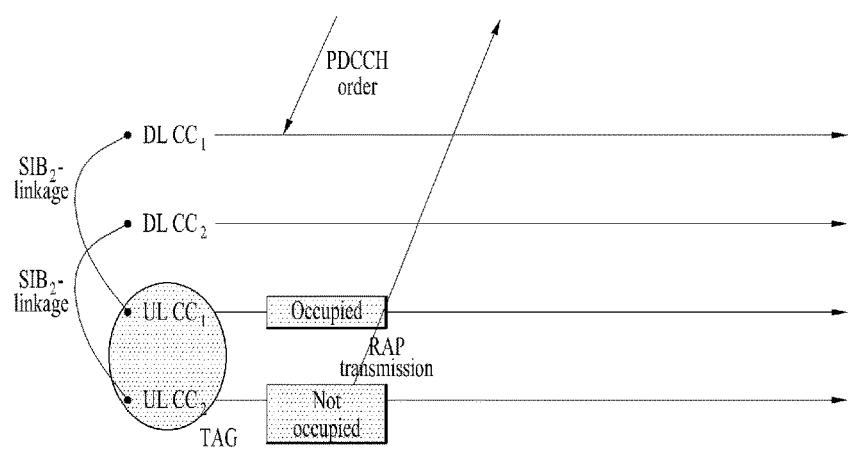
FIG. 16 is an example for performing a random access procedure in a carrier aggregation with at least one SCell operating in an unlicensed spectrum according to embodiments of the present invention.

FIG. 16 is an example for performing a random access procedure in a carrier aggregation with at least one SCell operating in an unlicensed spectrum according to embodiments of the present invention.

The UE is configured with DL CC1, DL CC2, UL CC1, and UL CC2. UL CC 1 is associated with the DL CC1 while UL CC2 is associated with the DL CC2 by the eNB through SIB2. UL CC1 and UL CC2 belong to the same TAG. The UE receives a PDCCH order on DL CC1, which triggers a random access procedure by indicating a random access preamble. The UE checks the TAG to which UL CC1 belongs to. In the TAG, for UL CC1 and UL CC2, the UE checks whether UL CC1 and UL CC2 are occupied or not by other transmitters. UL CC1 is occupied while UL CC2 is not occupied. The UE transmits the indicated random access preamble on the UL CC2.

The embodiments of the present invention described hereinbelow are combinations of elements and features of the present invention. The elements or features may be considered selective unless otherwise mentioned. Each element or feature may be practiced without being combined with other elements or features. Further, an embodiment of the present invention may be constructed by combining parts of the elements and/or features. Operation orders described in embodiments of the present invention may be rearranged. Some constructions of any one embodiment may be included in another embodiment and may be replaced with corresponding constructions of another embodiment. It is obvious to those skilled in the art that claims that are not explicitly cited in each other in the appended claims may be presented in combination as an embodiment of the present invention or included as a new claim by subsequent amendment after the application is filed.

In the embodiments of the present invention, a specific operation described as performed by the BS may be performed by an upper node of the BS. Namely, it is apparent that, in a network comprised of a plurality of network nodes including a BS, various operations performed for communication with an MS may be performed by the BS, or network nodes other than the BS. The term 'eNB' may be replaced with the term 'fixed station', 'Node B', 'Base Station (BS)', 'access point', etc.

The above-described embodiments may be implemented by various means, for example, by hardware, firmware, software, or a combination thereof.

In a hardware configuration, the method according to the embodiments of the present invention may be implemented by one or more Application Specific Integrated Circuits (ASICs), Digital Signal Processors (DSPs), Digital Signal Processing Devices (DSPDs), Programmable Logic Devices (PLDs), Field Programmable Gate Arrays (FPGAs), processors, controllers, microcontrollers, or microprocessors.

In a firmware or software configuration, the method according to the embodiments of the present invention may be implemented in the form of modules, procedures, functions, etc. performing the above-described functions or operations. Software code may be stored in a memory unit and executed by a processor. The memory unit may be located at the interior or exterior of the processor and may transmit and receive data to and from the processor via various known means.

Those skilled in the art will appreciate that the present invention may be carried out in other specific ways than those set forth herein without departing from essential characteristics of the present invention. The above embodiments are therefore to be construed in all aspects as illustrative and not restrictive. The scope of the invention should be determined by the appended claims, not by the above description, and all changes coming within the meaning of the appended claims are intended to be embraced therein.

INDUSTRIAL APPLICABILITY

While the above-described method has been described centering on an example applied to the 3GPP LTE system, the present invention is applicable to a variety of wireless communication systems in addition to the 3GPP LTE system.

The invention claimed is:

1. A method for a User Equipment (UE) operating in a wireless communication system, the method comprising:
    configuring with a Timing Advance Group (TAG) to which at least two uplink (UL) cells belong;
    receiving a Physical Downlink Control Channel (PDCCH) order from an eNodeB (eNB) on a downlink (DL) cell associated with a first UL cell in the TAG, wherein the PDCCH order triggers a random access procedure by informing a random access preamble;
    determining whether the first UL cell is available for transmitting the random access preamble;
    selecting one of the at least two UL cells which is available for transmitting the random access preamble if the first cell is determined as unavailable; and
    transmitting the informed random access preamble on the selected one of the at least two UL cells,
    wherein the first UL cell is determined as unavailable if it is occupied by other transmitters as a result of a Listen Before Talk (LBT) procedure.

2. The method according to claim 1, further comprising not transmitting the random access preamble if all UL cells in the TAG are not unavailable.

3. The method according to claim 1, further comprising incrementing a counter by 1 when the informed random access preamble is transmitted.

4. The method according to claim 3, wherein the counter is not incremented when the informed random access preamble is not transmitted.

5. The method according to claim 4, wherein the counter is a PREAMBLE_TRANSMISSION_COUNTER.

6. The method according to claim 3, wherein the counter is a PREAMBLE_TRANSMISSION_COUNTER.

7. The method according to claim 1, wherein the eNB informs that the DL cell is associated with the first UL cell through System information Block Type 2 (SIB2).

8. A User Equipment (UE) operating in a wireless communication system, the UE comprising:
    a Radio Frequency (RF) module configured to transmit and receive signals; and
    a processor configured to:
    configure with a Timing Advance Group (TAG) to which at least two uplink (UL) cells belong
    control the RF module to receive a Physical Downlink Control Channel (PDCCH) order from an eNodeB (eNB) on a downlink (DL) cell associated with a first UL cell in the TAG, wherein the PDCCH order triggers a random access procedure by informing a random access preamble;
    determine whether the first UL cell is available for transmitting the random access preamble;
    select one of the at least two UL cells which is available for transmitting the random access preamble if the first cell is determined as unavailable; and
    control the RF module to transmit the informed random access preamble on the selected one of the at least two UL cells,
    wherein the first UL cell is determined as unavailable if it is occupied by other transmitters as a result of a Listen Before Talk (LBT) procedure.

9. The UE according to claim 8, wherein the processor is further configured to not control the RF unit to transmit the random access preamble if all UL cells in the TAG are unavailable.

10. The UE according to claim 8, wherein the processor is further configured to increment a counter by 1 when the informed random access preamble is transmitted.

11. The UE according to claim 10, wherein the counter is not incremented when the informed random access preamble is not transmitted.

12. The UE according to claim 11, wherein the counter is a PREAMBLE_TRANSMISSION_COUNTER.

13. The UE according to claim 10, wherein the counter is a PREAMBLE_TRANSMISSION_COUNTER.

14. The UE according to claim 8, wherein the eNB informs that the DL cell is associated with the first UL cell through System information Block Type 2 (SIB2).

* * * * *